(No Model.) 4 Sheets—Sheet 3.
R. C. FAY.
LATHE.
No. 332,335. Patented Dec. 15, 1885.
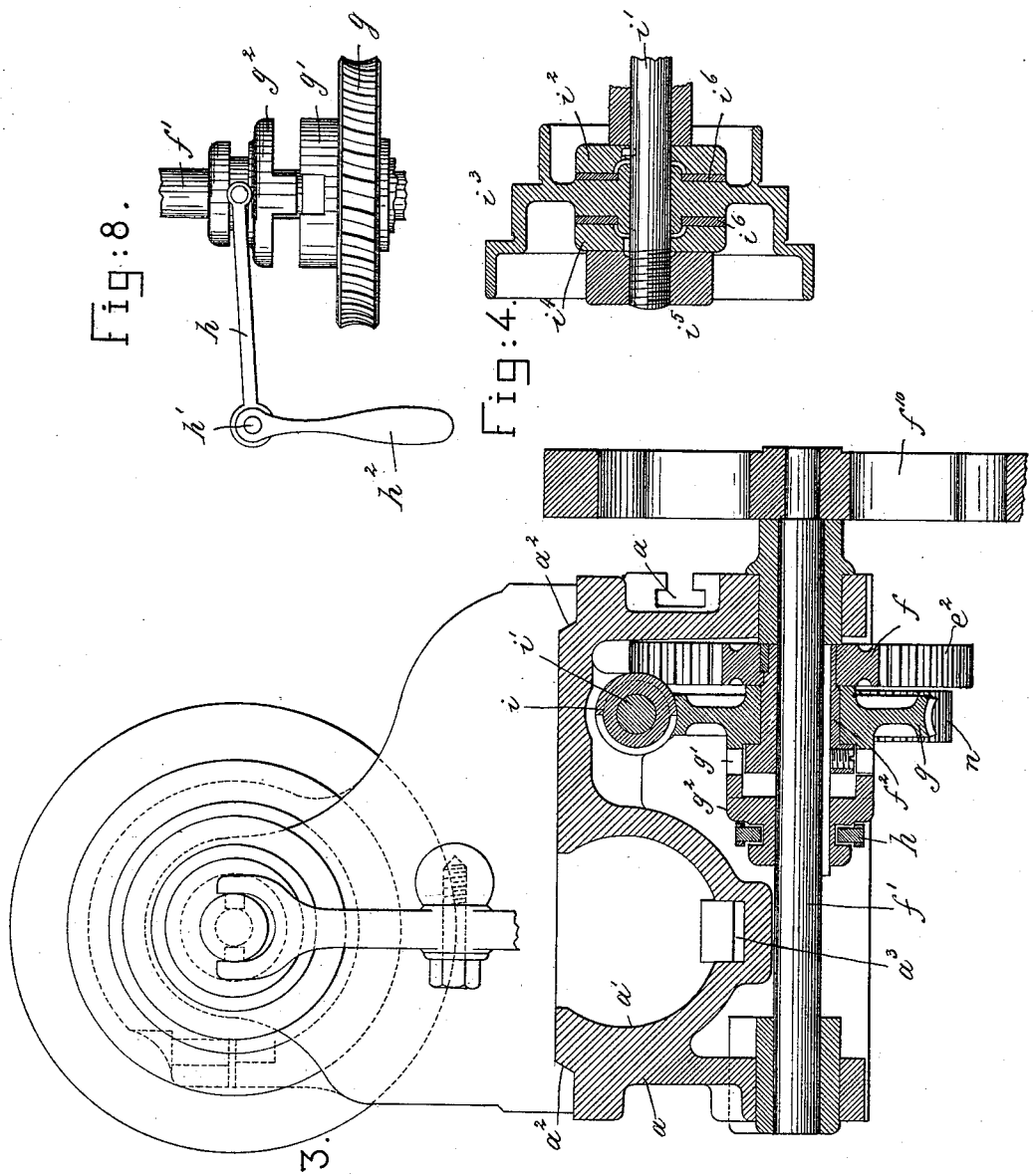
Witnesses.
Inventor.

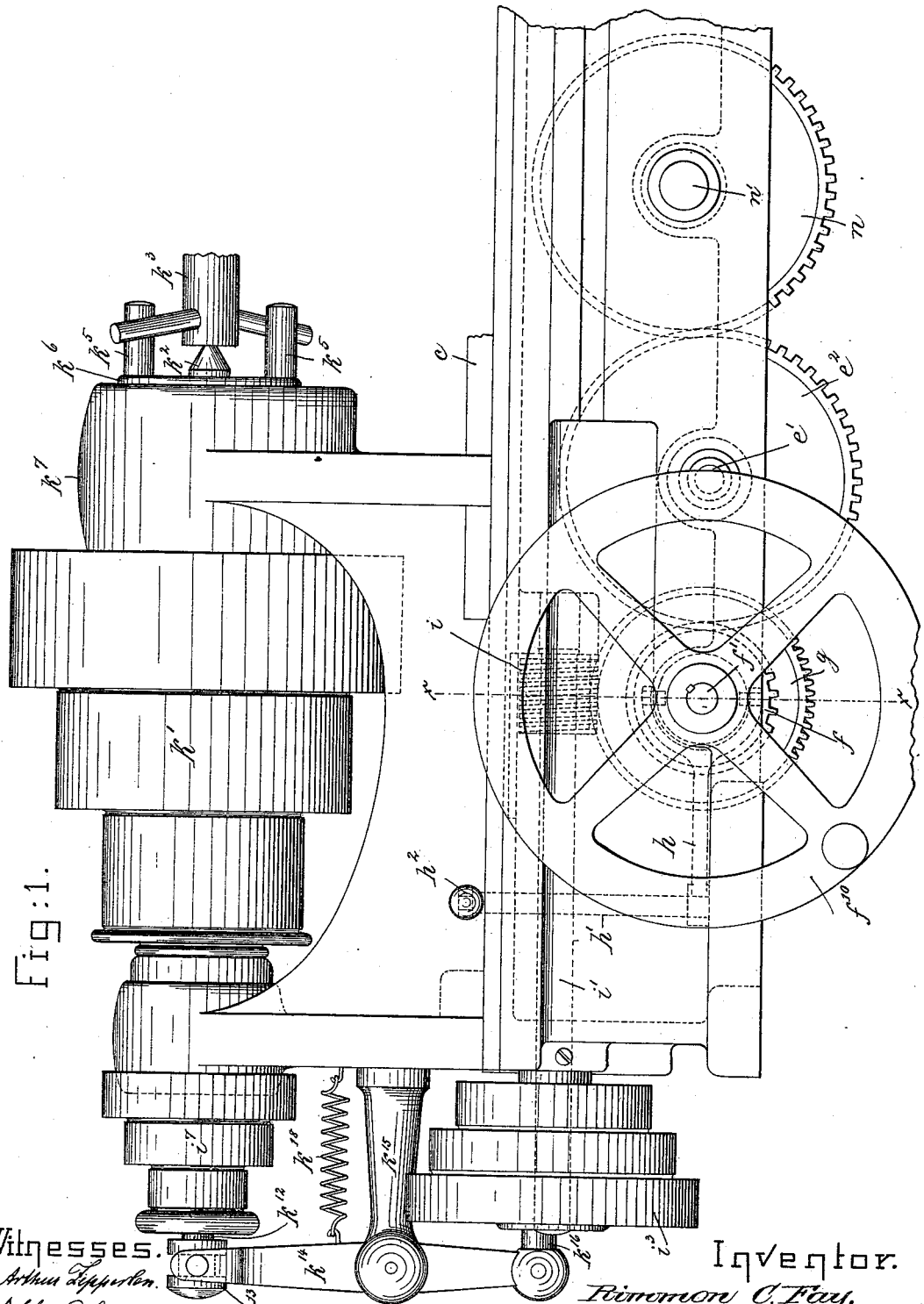

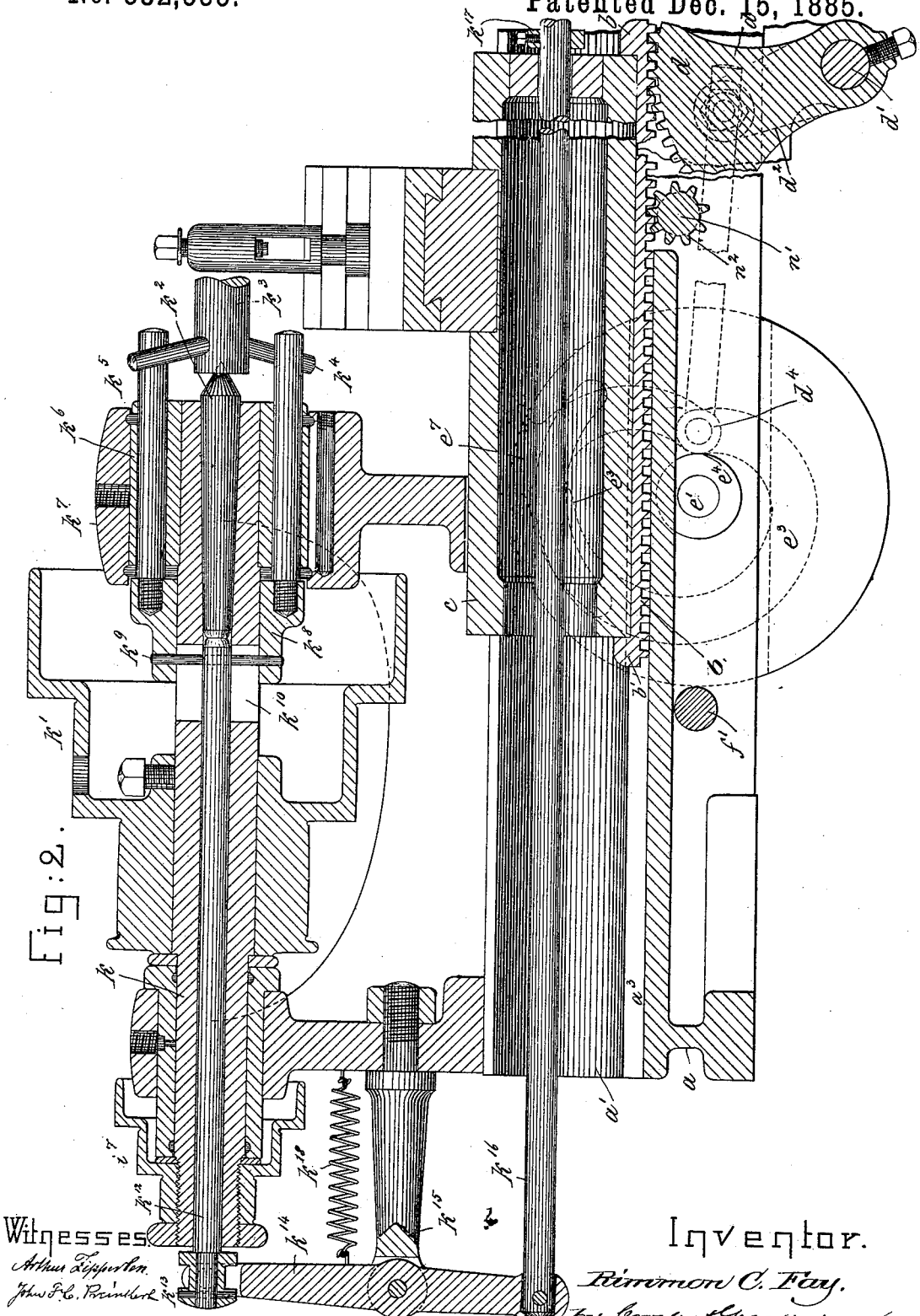

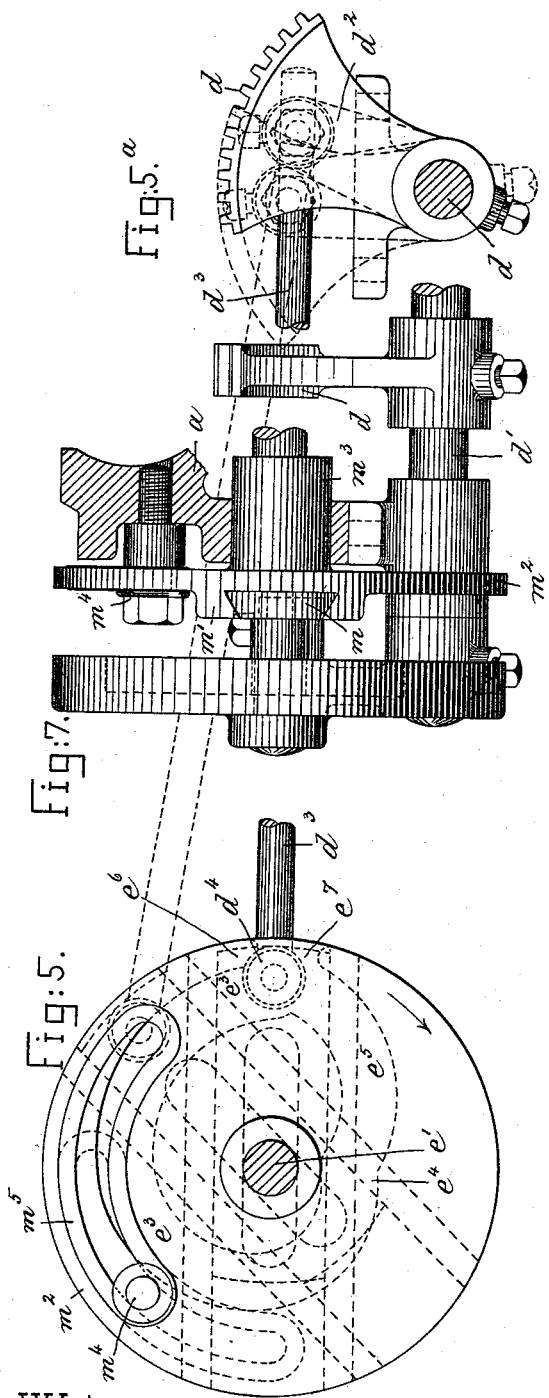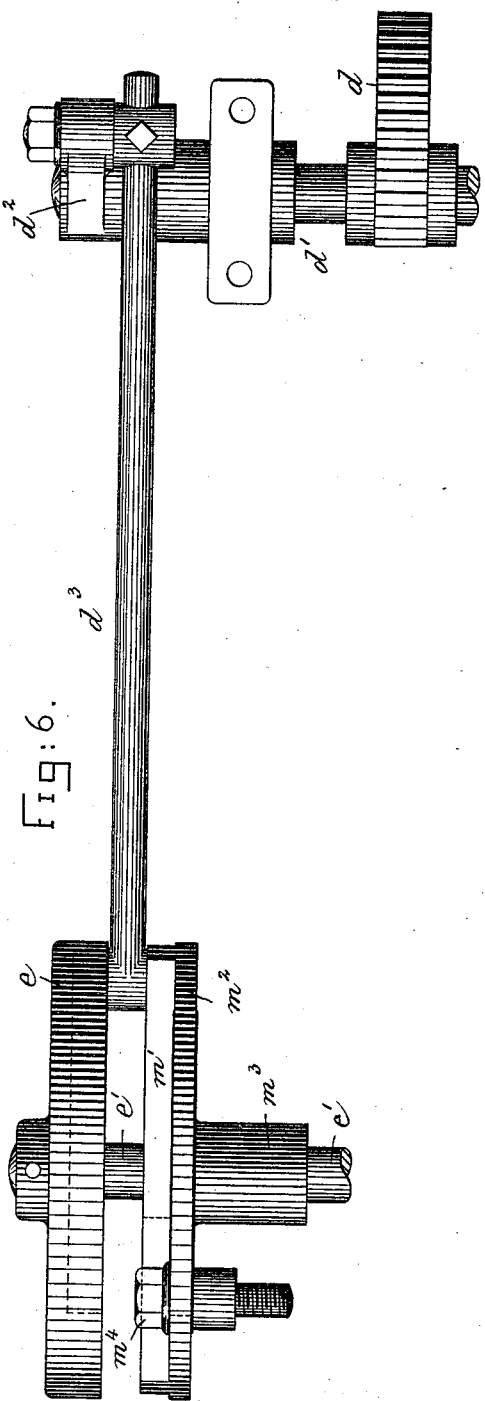

UNITED STATES PATENT OFFICE.

RIMMON C. FAY, OF HOPEDALE, MASSACHUSETTS.

LATHE.

SPECIFICATION forming part of Letters Patent No. 332,335, dated December 15, 1885.

Application filed June 1, 1885. Serial No. 167,126. (No model.)

*To all whom it may concern:*

Be it known that I, RIMMON C. FAY, of Hopedale, county of Worcester, State of Massachusetts have invented an Improvement in Lathes, of which the following description, in connection with the accompanying drawings, is a specification, like letters on the drawings representing like parts.

My invention relating to lathes is shown embodied in a lathe for small work, the object of my invention being to produce a lathe that is rapid and convenient and nearly entirely automatic in operation.

In my Patent No. 329,381, October 27, 1885, I have shown and described a lathe for small work, in which the tool-carriage has, in addition to its longitudinal or feeding movement from end to end of the material to be cut, also a rocking movement, by which the cutting portion of the tool is moved inward or outward from the axes of the material operated upon, to shape the same in accordance with a pattern or templet on the lathe-bed.

The lathe forming the subject of the present invention is intended to have a tool-carriage of similar character, and the invention consists mainly in novel features of the feed mechanism and also of the mechanism for disengaging the material being turned from the revolving spindle or chuck at the end of the turning operation, the construction being such that the lathe-spindle may be kept revolving continuously at uniform speed, and after a piece of material has been placed on the centers and the tool-carriage started by the operator the forward or feeding movement of said tool-carriage will be continued at the proper speed, and the tool then retracted or moved backward at a higher speed, at the end of which backward movement the feed mechanism automatically ceases to operate and the material that has been turned is disengaged by the dog or chuck, ready to be removed and replaced by another piece. The lathe is provided with two independent feed devices, one of which is adapted to produce a uniform feed and may be used for general work, while the other includes a feed-cam and adjusting device for varying the feeding effect produced by it, so that the carriage may have a greater or less range of movement, as may be desired, the said cam usually being designed for special work, and employed when a large number of pieces are to be turned of a uniform size and shape.

Figure 1 is a side elevation of the head-stock and feed mechanism of the lathe; Fig. 2, a longitudinal section thereof; Fig. 3, an end elevation of the lathe-spindle and connected parts, showing the feed mechanism in section on line $x\,x$, Fig. 1; Fig. 4, a longitudinal section of the actuating-pulley for the feed mechanism; Figs. 5 and $5^a$, a side elevation of the feed-cam, its adjusting device, and connecting mechanism between it and the tool-carriage; Fig. 6, a plan view of these parts; Fig. 7, an end elevation thereof, and Fig. 8 a detail, to be referred to.

The lathe-bed $a$ may be of substantially the same construction as in the patent referred to, the said bed $a$ having a cylindrical way, $a'$, for the tool-carriage, and independent ways or guides $a^2$ for the head and tail stocks, the latter not being shown, as it may be of any usual construction. The way $a'$ is in this instance provided with a longitudinal guide or groove, $a^3$, forming a guide for the toothed slide or rack-bar $b$, (see Fig. 2,) having shoulders $b'$, which engage the ends of the guide portion $c$ of the tool-carriage, which fits within the cylindrical way $a'$ of the lathe-bed, and has a longitudinal and rocking motion therein, as described in the aforesaid patent, the rocking motion being governed by a suitable templet or pattern surface, which may be fastened upon the lathe-bed by bolts co-operating with a groove, $a^3$, provided for that purpose, substantially as in the former application, these devices forming no part of the present invention. The toothed portion of the feed-rack bar $b$ projects downward in a groove, $a^3$, and its upper surface between the shoulders $b'$ is coincident with the cylindrical inner surface of the way $a'$ in the bed, so that the tool-carriage turns freely in the said way about the axis thereof, independently of the rack-bar $b$, although caused to accompany the said rack-bar in its longitudinal movement parallel with the axis of the way. The rack-bar $b$, constituting a portion of the feed mechanism, is engaged by a segmental gear, $d$, fastened upon a shaft, $d'$, having its bearings fixed upon the under side of the lathe-bed, the said shaft being provided with a crank or arm, $d^2$, (see Fig. 6,) connected with a rod or pitman, $d^3$, provided with a stud or projection, $d^4$, (see Figs. 2 and 5,) entering a groove of and actuated by a cam, $e$, fixed upon a shaft, $e'$, provided with a gear, $e^2$, (see Fig. 1,) meshing with a gear, $f$, fast upon a sleeve, $f^2$, (see Fig. 3,) splined on a shaft, $f'$. A worm-gear, $g$, loose upon said sleeve, is provided with a clutch member, $g'$, adapted to be engaged by a clutch member, $g^2$, splined on the shaft $f'$ and operated by a shipper, $h$, (see Figs. 1 and 8,) the latter showing the clutch and its shipper in plan view connected with rock-shaft $h'$, provided with a handle, $h^2$, by which it may be operated to engage or disengage the members of the clutch, and thus connect the worm-gear $g$ with the shaft $f'$ and gear $f$, or disengage the same, leaving the said worm-gear $g$ free to turn, without affecting the gear $f$ and gear $e^2$ and parts actuated thereby.

The worm-gear $g$ is rotated continuously and at uniform speed while the lathe is in operation by a worm, $i$, on a shaft, $i'$, having a hub or collar, $i^2$, fixed thereon, (see Fig. 4,) and an actuating cone-pulley, $i^3$, loose on the said shaft $i'$, but having its central or hub portion embraced between the collar $i^2$ and an adjustable collar, $i^4$, which may be forced against the pulley $i^3$ by a nut, $i^5$, with sufficient pressure to cause the said pulley to actuate the said shaft with sufficient power to overcome the normal resistance of the feed mechanism. When, however, the shaft $i'$ is positively stopped or restrained from moving, the pulley $i^3$ may continue to turn, overcoming the friction between it and the collars $i^2$ $i^4$ or washers $i^6$, of rawhide, leather, or similar somewhat-yielding material, interposed between the said collars and pulley, as shown in Fig. 4. The said parts constitute a friction-clutch for the feed mechanism, having sufficient holding power to perform the normal feeding operation, but insufficient to cause breakage or do damage to the parts in case the said feed mechanism is positively stopped.

The pulley $i^3$ is driven by means of a belt from a pulley, $i^7$, fast upon the spindle $k$ of the lathe, (see Fig. 2,) and through the connections just described causes the feed-cam $e$ to rotate at uniform speed. The groove of the feed-cam $e$ is provided with a spiral feed-actuating portion, $e^3$, extending about three-fourths of the way around the cam, and progressing uniformly from near the circumference to the point $e^4$, (see Figs. 2 and 5,) near the center or hub of the cam, so that the stud or projection $d^4$ will be moved uniformly inward toward the center of the cam during about three-fourths of a revolution thereof, and will, through the toothed segment $d$, produce a uniform movement of the tool-carriage from the tail-stock toward the head-stock, feeding the tool along the material that is to be turned or cut. From the point $e^4$ the cam-groove has a portion, $e^5$, producing a rapid outthrow during the remaining quarter-revolution of the cam, and carrying the stud $d^4$ outward slightly beyond the point at which the feeding portion $e^3$ of the cam begins to operate thereon, so that in the farther rotation of the cam the projection $d^4$ will be struck by a shoulder, $e^6$, (shown in dotted lines, Fig. 5,) at the outer end of the feeding portion, which shoulder has a curved seat fitting the roller of the projection $d^4$, too steep or engaging the said roller at too great an angle to its line of movement to move the stud $d^4$, the said shoulder thus constituting a stop by which the cam $e$ will be arrested, thus stopping the train of gearing $e^2$ $f$ $g$ and the shaft $i'$, so that the feed-pulley $i^3$ will slip on the said shaft and no further effect will be produced on the feed mechanism until the stud $d^4$ is thrown by the operator forward far enough to enter the feeding or actuating portion $e^3$ of the cam-groove, when another forward or feed movement of the tool-carriage, followed by a more rapid retraction thereof, will take place. The stud $d^4$ is caused to enter the feed portion $e^3$ of the cam-groove by the operator moving the tool-carriage by hand after the work has been properly set up in the lathe.

It will be understood, referring to Figs. 2 and 5, that the cam-groove $e^3$ $e^5$ will produce a movement of the stud $d^4$ toward and from the axis of the said cam; but it does not necessarily define the path of movement of the said stud, which requires to be guided in this movement. The stud $d^4$ is caused to move toward and from the center of the cam, preferably in a radial path, by a slide, $m$, (see Fig. 7,) connected with the said stud and movable in a guide, $m'$, held stationary with relation to the lathe-bed $a$, as best shown in Fig. 7, the said guide $m'$ being made in a disk, $m^2$, having a hub, $m^3$, surrounding and forming a bearing for the shaft $e'$, and being capable of rotation about the said shaft, for the purpose of adjusting the position of the guide $m'$, the said disk $m^2$ being held stationary when properly adjusted by a clamping device, $m^4$, (see Fig. 7,) passing through a curved slot, $m^5$, in the plate $m^2$, (see Fig. 5,) and fastened to the lathe-bed, as shown in Fig. 7.

By adjusting the position of the guide $m'$ the effect of the cam on the segment $d$, and consequently the travel of the tool-carriage, may be varied. For instance, the greatest effect or the longest travel will be produced when the guide is substantially in line with the connecting-rod $d^3$, so that the movement of the stud $d^4$ produces an equal endwise movement of the said rod. If, however, the guide $m'$ should be turned substantially at right angles to the length of the rod, the cam would merely produce a lateral movement of the rod, oscillating it back and forth on its pivotal connection with the arm $d^2$ and producing almost no effect on said arm, or an extremely short travel of the tool-carriage, and by setting the guide $m'$ at any desired position between that parallel with the rod $d^3$ or axis of the lathe-bed and at right angles thereto any desired length of feed less than the maximum may be produced.

It will be understood that the cam-groove may be made of any shape to produce the irregular feed, if desired, for any particular kind of special work, and that when once set the successive feeding operations will be exactly alike. The position of the stroke or travel of the tool-carriage may be varied by turning the segment $d$ far enough to disengage it from the rack $b$, loosening the said segment on shaft $d'$ for this purpose, if necessary, and then sliding the carriage to the desired position and re-engaging the segment $d$ with the rack at another point.

When desired to produce a uniform feed of the tool-carriage in one direction only without automatically retracting the same, the segment $d$ may be disengaged from the rack-bar, or the stud $d^4$ thrown out of the cam-groove through the opening $e^7$, (see Fig. 5,) where the outer wall of the cam-groove shown in dotted lines is cut away, at the end of the retracting portion $e^5$ of said groove, and a gear, $n$, splined on a shaft, $n'$, may be moved laterally on the said shaft into engagement with the gear $e^2$, in which case the shaft $n'$ will be rotated from the pulley $i^3$ through the action of the worm $i$ and gears $g$, $f$, and $e^2$. The shaft $n'$ is provided with a pinion, $n^2$, which meshes with the rack $b$, as shown in Fig. 2, and thus actuates the said rack when the shaft $n'$ is rotated by the feed-actuating pulley, as just described—that is, when the gear $n$ is engaged with the gear $e^2$.

When the carriage is operated by the feed-cam $e$ and the segment $d$, the gear $n$ has to be disengaged from the gear $e^2$, being moved along its shaft out of engagement with the said gear $e^2$, as shown in Fig. 3.

The spindle $k$ of the lathe is actuated by the cone-pulley $k'$ in the usual manner, and provided with a center, $k^2$, to support one end of the piece $k^3$ to be turned. As shown in this instance, the said piece $k^3$ is provided with arms $k^4$, engaged by pins $k^5$, having a longitudinal movement in a bushing, $k^6$, supported on or forming part of the spindle, and turning therewith in a bearing, $k^7$, of the head-stock, the said work-engaging pins $k^5$ being connected with a longitudinally-sliding collar, $k^8$, connected by a pin, $k^9$, passing through the slot $k^{10}$ in the spindle, with a rod, $k^{12}$, provided with a grooved collar, $k^{13}$, engaged by a forked lever, $k^{14}$, pivoted on an arm, $k^{15}$, fixed on the head-stock, and connected with a rod, $k^{16}$, passing through the bed and tool carriage, and provided with an adjustable collar or projection, $k^{17}$, (see Fig. 2,) which may be placed in proper position to be engaged by the carriage just as it is finishing its retractive or backward movement, when it will move the rod $k^{12}$ in the proper direction to withdraw the work-engaging pins $k^5$ from engagement with the arms $k^4$, so that the work or piece $k^3$ will cease to rotate just at the time when the carriage comes to rest, and the feed mechanism is stopped by the shoulder $e^6$ of the feed-cam engaging the projection $d^4$. The operator may then remove the piece which has been turned and substitute a new piece to be turned, after which, by moving the carriage forward a short distance, the pins $k^5$ will be permitted to engage the projections $k^4$, the rod $k^{12}$ being moved in the proper direction by a spring, $k^{18}$, acting on the lever $k^{14}$, and at the same time the projection $d^4$ will be engaged by the feed portion of the cam, so that the piece to be turned will begin to rotate and the tool-carriage will begin to be fed along the same at the same moment.

When desired to move the tool-carriage or feed the same by hand, the clutch $g'$ $g^2$ may be disengaged and the shaft $f'$ turned by hand, it being provided with a suitable crank or hand wheel, $f^{10}$, (see Fig. 1,) for this purpose.

The clutch $g'$ $g^2$ will usually be disengaged by the operator as soon as the feeding and retractive movement of the tool-carriage is finished; and it is obvious that the said clutch might be disengaged automatically at the end of the feeding operation, so that the friction-clutch or connection between the pulley $i^3$ and shaft $i'$ would not have to be depended upon for the normal operation of the lathe, but would merely serve to prevent breakage in case any unusual obstruction should occur to interfere with the feeding movement.

I claim—

1. The combination of the lathe-bed with a tool-carriage having a longitudinal and rocking movement thereon, the rack engaging said carriage, toothed segment meshing therewith, and feed-cam and actuating mechanism therefor, substantially as described.

2. The bed having a cylindrical way provided with a longitudinal groove, combined with a tool-carriage having a longitudinal and rocking movement on said way, and a rack engaged with said carriage and movable in said groove, and actuating mechanism therefor, substantially as described.

3. The combination of a cam and stud actuated thereby with an adjustable guide for said stud, which determines the path or direction of movement of the stud when actuated by the cam, substantially as described.

4. The cam having portions which throw in opposite directions, and a shoulder or stop combined with actuating mechanism for the said cam, and a friction-clutch which yields when the said cam is stopped, substantially as described.

5. The lathe-spindle and longitudinally-movable pins rotated therewith, which engage the work or piece to be turned, combined with the tool-carriage, feed mechanism therefor, and connecting mechanism between said carriage and the work-engaging pins, by which the latter are disengaged from the work at the end of the movement of the tool-carriage, substantially as described.

6. The lathe-bed, and tool-carriage movable thereon, combined with the lathe-spindle, and longitudinally-movable work-engaging pins connected with the said spindle, and longitudinally-movable rod in the said spindle connected with said pins, a lever having one arm connected with the said rod, and a rod provided with a projection engaged by the tool-carriage and connected with the other arm of the said lever, substantially as described.

In testimony whereof I have signed my name to this specification in the presence of two subscribing witnesses.

RIMMON C. FAY.

Witnesses:
F. J. DUTCHER,
WM. J. WOODS.